(12) United States Patent
Haase et al.

(10) Patent No.: US 12,007,546 B2
(45) Date of Patent: Jun. 11, 2024

(54) DETERMINATION OF CONTEXTUAL INFORMATION FOR INTERCHANGEABLE COMPONENTS OF AN OPTICAL SYSTEM

(71) Applicant: Carl Zeiss Microscopy GmbH, Jena (DE)

(72) Inventors: Daniel Haase, Zöllnitz (DE); Thomas Ohrt, Golmsdorf (DE)

(73) Assignee: Carl Zeiss Microscopy GmbH, Jena (DE)

( * ) Notice: Subject to any disclaimer, the term of this patent is extended or adjusted under 35 U.S.C. 154(b) by 779 days.

(21) Appl. No.: 16/610,246

(22) PCT Filed: Apr. 23, 2018

(86) PCT No.: PCT/EP2018/060295
§ 371 (c)(1),
(2) Date: Nov. 1, 2019

(87) PCT Pub. No.: WO2018/202454
PCT Pub. Date: Nov. 8, 2018

(65) Prior Publication Data
US 2020/0057291 A1 Feb. 20, 2020

(30) Foreign Application Priority Data
May 5, 2017 (DE) ...................... 10 2017 109 698.1

(51) Int. Cl.
*G02B 21/24* (2006.01)
*G02B 21/36* (2006.01)
(Continued)

(52) U.S. Cl.
CPC ........... *G02B 21/24* (2013.01); *G02B 21/362* (2013.01); *G02B 21/365* (2013.01); *G06N 20/00* (2019.01);
(Continued)

(58) Field of Classification Search
CPC .... G02B 21/24; G02B 21/362; G02B 21/365; G06N 20/00; G06T 7/73; G06V 20/20;
(Continued)

(56) References Cited

U.S. PATENT DOCUMENTS 7,110,036 B2 * 9/2006 Gladnick ............. H04N 23/663
348/86
2002/0031255 A1 3/2002 Kasdan et al.
(Continued)

FOREIGN PATENT DOCUMENTS

CN 103718209 A * 4/2014 .......... G01B 11/272
CN 103718209 A 4/2014
(Continued)

OTHER PUBLICATIONS

Ulrich et al. "CAD-Based Recognition of 3D Objects in Monocular Images", 2009 IEEE International Conference on Robotics and Automation, Kobe International Conference Center, Kobe, Japan, May 12-17, 2009 (provided via IDS dated Nov. 1, 2019) (Year: 2009).*

(Continued)

*Primary Examiner* — Richard A Hansell, Jr.
(74) *Attorney, Agent, or Firm* — Duane Morris LLP

(57) ABSTRACT

At least one image is obtained which images an external view of at least one interchangeable component (111-116) of an optical system (100). Contextual information for the at least one interchangeable component (111-116) is determined on the basis of the at least one image.

14 Claims, 7 Drawing Sheets

(51) Int. Cl.
*G06N 20/00* (2019.01)
*G06T 7/73* (2017.01)
*G06V 10/44* (2022.01)
*G06V 10/764* (2022.01)
*G06V 10/82* (2022.01)
*G06V 20/20* (2022.01)

(52) U.S. Cl.
CPC .............. *G06T 7/73* (2017.01); *G06V 10/454* (2022.01); *G06V 10/764* (2022.01); *G06V 10/82* (2022.01); *G06V 20/20* (2022.01)

(58) Field of Classification Search
CPC .... G06V 10/454; G06V 10/82; G06K 9/6269; G06K 9/6273
See application file for complete search history.

(56) References Cited

U.S. PATENT DOCUMENTS

| | | | |
|---|---|---|---|
| 2002/0168100 A1 | 11/2002 | Woodall | |
| 2004/0066964 A1* | 4/2004 | Neubauer | G06T 7/155 382/199 |
| 2004/0147840 A1* | 7/2004 | Duggirala | G06T 7/0012 600/437 |
| 2007/0159686 A1* | 7/2007 | Fiedler | G02B 21/36 359/368 |
| 2008/0304818 A1* | 12/2008 | Kranz | G03B 17/14 250/208.2 |
| 2014/0126839 A1* | 5/2014 | Qin | G06T 3/14 382/294 |
| 2016/0070945 A1 | 3/2016 | Merlo et al. | |
| 2016/0321502 A1* | 11/2016 | Kamath | G06Q 30/00 |
| 2017/0124409 A1 | 5/2017 | Choi et al. | |
| 2017/0124692 A1* | 5/2017 | Yoshida | G06T 7/0004 |
| 2017/0161243 A1* | 6/2017 | Manoraj | G06F 40/169 |
| 2017/0300781 A1* | 10/2017 | Lehrmann | G06V 30/196 |

FOREIGN PATENT DOCUMENTS

| | | |
|---|---|---|
| DE | 196 12 683 A1 | 10/1996 |
| DE | 198 39 777 A1 | 3/1999 |
| DE | 102 45 170 A1 | 4/2004 |
| DE | 10 2005 010 479 A1 | 9/2006 |
| DE | 10 2006 019 449 A1 | 10/2007 |
| DE | 10 2014 113 173 A1 | 3/2016 |
| EP | 1 355 182 A1 | 10/2003 |
| EP | 2.950 519 A1 | 12/2015 |
| JP | 2017027384 A * | 2/2017 |
| KR | 10 2005 0000729 A | 1/2005 |
| WO | 2005062104 A1 | 7/2005 |

OTHER PUBLICATIONS

Krizhevsky, Alex, et al.; "ImageNet Classification with Deep Convolutional Neural Networks"; NIPS 2012; 1-9.
Reyes, Angie K., et al.; "Fine-tuning Deep Convolutional Networks for Plant Recognition"; CLEF 2015; 1-9.
Razavian, Ali Sharif, et al.; "CNN Features of-the-shelf: an Astounding Baseline for Recognition"; CVPR—Workshops 2014; 806-813.
Haralick, Robert M., et al.; "Textural Features for Image Classification"; IEEE Transactions on Systems, Man and Cybernetics 1973; SMC-3(6):610-621.
Bishop, Christopher M.; "Pattern Recognition and Machine Learning"; Springer 2006.
Ulrich, Markus, et al.; "CAD-Based Recognition of 3D Objects in Monocular Images", ICRA 2009; 1-8.
Barrow, H.G., et al.; "Parametric Correspondence and Chamfer Matching: Two New Techniques for Image Matching"; IJCAI 1977; 1-17.
International Search Report dated Nov. 28, 2018.
German Search Report dated Jan. 31, 2018.
Chinese Office Action dated May 28, 2021 for 201880038159.9 with English translation.

* cited by examiner

DETERMINATION OF CONTEXTUAL INFORMATION FOR INTERCHANGEABLE COMPONENTS OF AN OPTICAL SYSTEM

RELATED APPLICATIONS

The present application is a U.S. National Stage application of International PCT Application No. PCT/EP2018/060295 filed on Apr. 23, 2018, which claims priority benefit of German Application No. DE 10 2017 109 698.1 filed on May 5, 2017, the contents of each are incorporated by reference in their entirety.

FIELD OF THE INVENTION

Various embodiments of the invention generally relate to an optical system with one or more interchangeable components. Various examples of the invention relate, in particular, to techniques for determining contextual information for one or more interchangeable components of the optical system on the basis of one or more images which image an external view of the one or more interchangeable components.

BACKGROUND OF THE INVENTION

When changing the interchangeable components of a microscope system, it may often be desirable to obtain knowledge about the current operating state of the microscope system, i.e. to determine one or more operating parameters. For the correct operation of the microscope system, it is often desirable to obtain contextual information relating to the interchangeable components used. Examples of such contextual information that may be useful for the operation of the microscope system include for example the available magnification if the interchangeable component is an interchangeable objective, the transmission behavior of the interchangeable component, or tolerances.

In reference implementations, it is necessary to manually input such contextual information indicating one or more operating parameters. In this case, intuitive operator control concepts are becoming ever more important for the purchase of electronic devices. Microscope systems, in particular, can benefit from better automation for various reasons:

In the case of complex "high end" microscope stands, e.g. a laser scanning microscope (LSM), comprehensive motorization is desirable, which is why a multiplicity of movable parts and ancillary components are often used. In order that the LSM can be operated in a user-friendly manner, a plurality of interchangeable components are automatically introduced/removed into/from the optical beam path or light sources/light paths are switched on/enabled. On account of the many combination possibilities and customer interfaces at the microscope stand, it is desirable to capture the interchangeable components used and the state/position of the interchangeable components as contextual information.

A further application involves the use of manual stands for digital recordings in light microscopy. In order that the recordings can be measured later, scalings of the recording should be available as contextual information, i.e. the magnification, detector aperture, and image correction.

In the case of eyepiece-based recordings, too, which involve attaching a portable device with camera—e.g. a cellphone or smartphone—to the stereomicroscope or generally to the microscope stand, contextual information relating to the objective is used in order to be able to carry out, in an image-based manner, measurements or corrections on the images captured by means of the camera. Therefore, reliable, automatic capture of the contextual information at the portable device is desirable in order that absolute measurements can be carried out later in image processing programs. In the meantime, attachments for portable devices have also become available for binoculars, spotting scopes and telescopes.

In this case, the prior art discloses various solutions for determining contextual information in an optical system having interchangeable components in an automated manner. In this case, e.g. the contextual information is transmitted between a data storage unit of the interchangeable component and a control device. For example, such transmission can be effected by way of wireless transponders, see DE 10 2005 010 479 A1. Another transmission technique utilizes magnetism or capacitances, see DE 102 45 170 A1. A further transmission technique utilizes sliding contacts. By way of example, it is possible to determine contextual information in reference implementations by means of Near Field Communication (NFC). A technique of Automatic Component Recognition (ACR) is also known.

However, such previously known techniques have specific limitations and disadvantages. For example, it may be relatively complex to realize a corresponding transmission apparatus. In addition, it may be possible that a corresponding transmission apparatus has a relatively high energy demand such that the supply with electrical energy must be elaborately designed.

Such reference techniques are furthermore based on the interchangeable components being modified. These modifications cause costs that adversely affect the price of the product and have to be managed with increased time expenditure. Not all interchangeable components can make possible subsequent conversion/modification. Manual entries into the system database also mean an additional outlay or constitute an operator control concept which is susceptible to errors.

SUMMARY OF THE INVENTION

Therefore, there is a need for improved techniques for determining contextual information for interchangeable components of an optical system. In particular, there is a need for such techniques that eliminate or alleviate at least one of the limitations and disadvantages mentioned above.

This object is achieved by the features of the independent patent claims. The features of the dependent patent claims define embodiments.

The method of the invention involves obtaining at least one image. The at least one image is an external view of at least one interchangeable component of an optical system. The method furthermore includes determining contextual information for the at least one interchangeable component on the basis of the at least one image.

By way of example, the method could include capturing the at least one image. The image can be captured by means of a camera. The image can be a multiplicity of pixels. By way of example, the image could be recorded in the visible spectrum. By way of further example, the image could be captured by means of a camera of a portable device, for example a smartphone camera or cellphone camera. The camera can thus have a varying pose in relation to the interchangeable component. The camera can be used under varying ambient conditions, e.g. different illumination scenarios, etc. Therefore, the method could furthermore include: determining a pose and/or an ambient condition with which the at least one image images the at least one interchangeable component. This can enable the contextual information to be determined more accurately, e.g. because the varying pose and/or varying ambient conditions can be compensated for.

However, it would also be possible for the image to be captured by means of a camera having a predefined distance and orientation (pose) in relation to the at least one interchangeable component of the optical system. For example, the camera could be installed fixedly with the optical system. Therefore, the at least one image could thus image the at least one interchangeable component with the predefined pose.

By way of example, the image can include the external view of the at least one interchangeable component in an incorporated state, i.e. image the interchangeable component in conjunction with one or more further interchangeable components and/or a base component of the optical system. For example, it would be possible for the at least one image to be captured in a temporal context before the operation of the optical system, i.e. for example directly before a measurement is carried out with the aid of the optical system or directly before an image recording is carried out by means of the optical system.

In this case, the techniques described herein can be applied to various types of optical systems. Examples include light microscopes (such as e.g. LSMs), telescopes, etc.

The contextual information can have various information contents. In one example, the contextual information could be indicative of a type of the at least one interchangeable component, for example a batch number or a serial number. A further example of contextual information includes the geometric properties of an interchangeable component in order to avoid collisions, for example. It would also be possible for the contextual information to be indicative of one or more operating parameters of the at least one interchangeable component. In this case, it would be possible, for example, for the one or more operating parameters to be determined on the basis of the type of the at least one interchangeable component. For example, the method could specifically furthermore include in association with determining the contextual information: determining a type of the at least one interchangeable component on the basis of the at least one image; and accessing a database and determining an operating parameter of the at least one interchangeable component on the basis of the type of the at least one interchangeable component. In this case, the database could be a local database stored for example in a memory of the optical system or of a portable terminal of the user. However, it would also be possible for the database to be a central database that is accessed via the Internet, for example.

Examples of operating parameters which can be indicated by means of the contextual information include for example geometric dimensions of the interchangeable component, operating instructions for example concerning the change of the respective interchangeable component, etc. If the interchangeable component is an objective, an operating parameter could denote for example the aperture or magnification of the interchangeable objective or aberrations brought about by the interchangeable objective.

By way of example, it would also be possible for the contextual information to be indicative of anomalies in relation to the external view of the at least one interchangeable component. By way of example, it would be possible for the method furthermore to comprise: recognizing anomalies in the at least one image. By way of example, the anomalies could concern for example scratches, contamination, damage, incorrect positioning, etc.

The techniques described herein can be used for various types of interchangeable components. By way of example, it would be possible for the at least one interchangeable component to be selected from the following group: interchangeable objective; stage insert; stage, illumination module; analyzer stand; Wollaston (Nomarski) prism; polarization filter; lens; grating; user-specific attachments; micromanipulators; transmitted-light arm; and filter insert.

By way of example, the contextual information could denote the position of such an interchangeable component. By way of example, the contextual information could be indicative of whether the transmitted-light arm is swung down or up. The contextual information could indicate the position of the stage insert, for example. The contextual information could also indicate geometric dimensions of the interchangeable component. It would then be possible, for example, on the basis of the contextual information, to recognize possible collisions between the interchangeable component and a further component of the optical system. Such collision recognition can make it possible to output a suitable warning to a user of the optical system, such that the collision can be avoided. For example, the collision recognition may necessitate determining a trajectory of the outer contour of the interchangeable component, said outer contour being determined on the basis of the geometric dimensions. By way of example, it is then possible to ascertain an overlap with one or more other components along the trajectory.

A stage insert can be configured to fix a sample object in a beam path of the optical system. By way of example, the stage insert could be configured to make possible a reflected-light geometry or a transmitted-light geometry. Accordingly, the illumination module could be configured to make possible an illumination of the sample object fixed by the stage insert. An analyzer and the filter insert, respectively, can provide specific filter functionality in relation to the beam path of the light of the optical system. The analyzer can be a polarizer which can be used in relation to differential interference contrast (DIC). The polarizer can be arranged in the illumination below the objective. The analyzer can be embodied as a slide. The stand can serve as a base component of the optical system and enable one or more interchangeable components to be fixed. By way of example, the stand could serve to fix a cellphone camera or some other camera to the microscope in relation to an eyepiece of the optical system. This is optional.

The contextual information can also be determined indirectly. By way of example, in relation to an interchangeable component, by means of the at least one image, it is possible to detect whether a locking element of the interchangeable component—e.g. a flap or a pin—is arranged in a specific position. The locking element can be imaged in the image. It may then be unnecessary to image a central region of the interchangeable component by means of the at least one image; on account of the position of the locking element, however, it is nevertheless possible to determine the contextual information for the interchangeable component. In general, it is unnecessary for the complete external view of the interchangeable component to be imaged.

Various effects can be achieved by the contextual information being determined on the basis of the at least one image. By way of example, it may be possible to determine the contextual information without complex modification of the interchangeable components. In particular, complex hardware solutions based on generating electrical signals and keeping available data storage units in the interchangeable components can be avoided. This reduces the complexity and nevertheless enables the contextual information to be determined reliably. Error-susceptible, manual solutions for inputting the contextual information are dispensible.

In the various examples described herein, the contextual information—e.g. in particular the type of the at least one interchangeable component—can be determined on the basis of the at least one image in various ways. By way of example, it would be possible to determine the contextual information using a computer-implemented machine learning algorithm. By way of example, the contextual information could be determined using an artificial neural network (ANN). Various types of ANN can be used here, for example convolutional neural networks (CNNs). See Krizhevsky, A. Sutskever, I. and Hinton, G. E. "ImageNet Classification with Deep Convolutional Neural Networks" (NIPS 2012). A CNN involves typically processing an input (e.g. image in the form of a 2D or 3D matrix) by means of in principle any desired but previously defined network architecture consisting of layers of various types (e.g. convolution layer, pooling layer, regularization layer, activation layer, etc.), wherein the output of the previous layer serves as input for the subsequent layer.

In this case, various techniques in association with machine learning and ANN can be used in the various examples described herein. Depending on the application, it is possible to use machine learning techniques, in particular also (but not exclusively) ANN for classification, regressing, segmentation, detection, localization, etc. By way of example, an ANN which expects one or more recorded images as input and yields a class (e.g. the type, state, etc., of an interchangeable component) as output could be used for the classification. The contextual information can then be determined on the basis of the class. In this case, the ANN used can be newly trained, or an already trained ANN can be refined in further training. See, for example, Reyes, Caicedo, Camargo: "Fine-tuning Deep Convolutional Networks for Plant Recognition", (CLEF 2015). As a further example, for the classification, an ANN could be used for extracting features by a procedure in which firstly the ANN is cut off at a specific layer and the corresponding activation is used as a feature (or feature vector). A classification can then be effected on the basis of these features extracted by the ANN by means of a downstream classification algorithm, for example of a support vector machine (SVM). See, for example, Razavian, Azizpour, Sullivan, Carlsson: "CNN Features off-the-shelf: an Astounding Baseline for Recognition", (CVPR-Workshops 2014). Alternatively, feature extraction from the images can also be carried out without an ANN, e.g. by means of a specifically developed extraction algorithm. Examples of features extracted by such an algorithm include e.g. an outer geometry of the interchangeable component, characteristic edges, projections or contrast profiles of the interchangeable component, color, reflectivity, texture, size and arrangement with respect to surrounding components, etc.

By way of example, regression techniques could also be employed. This could involve determining e.g. the position of an interchangeable component in a continuous result space. This means that for example the position of the interchangeable component in a reference coordinate system can be indicated continuously or quasi-continuously. A further example would be the determination of the filling level of a bottle for immersion liquid.

Machine learning methods can be trained on the basis of reference image data (consisting in each case of the image data and associated contextual information to be learned, such as e.g. the type of the imaged interchangeable component) of known interchangeable components. Such techniques can enable new or other interchangeable components or many different interchangeable components to be recognized in a flexible manner. Moreover, variable poses and/or ambient conditions can be compensated for.

In particular, by means of a machine learning algorithm such as e.g. an ANN, it may also be possible to recognize anomalies in the at least one image in relation to the at least one interchangeable component. By way of example, the anomalies can be recognized by virtue of local deviations between the features of the at least one interchangeable component that are expected by a model of the machine learning algorithm vis-à-vis the features imaged by the at least one image. In this way it could be possible, for example, to recognize erroneous operation of the optical system, for example because an interchangeable component has been inserted incorrectly into a stand of the optical system. Damage to an interchangeable component could also be recognized.

If the at least one interchangeable component includes an interchangeable objective, it would be possible, for example, for the at least one image to image a front side of the interchangeable objective. The front side can include e.g. a front lens. The front lens can be defined laterally with respect to the optical beam path.

Such techniques are based on the insight that in particular the front side of an interchangeable objective can be characteristic of the corresponding type of the interchangeable objective. Therefore, it may be possible to determine the contextual information particularly reliably, for example on the basis of specific features of the front side of the interchangeable objective. Such features can have e.g. an extent of the front lens, a height profile of the front side, etc. A further feature is the radial contrast profile of the front side.

An image of the front side can be captured e.g. by a camera incorporated at the stand.

It would specifically be possible, for example, to determine a center of the front side in the at least one image and then to determine a contrast profile of the at least one image in a radial direction proceeding from the center of the front side. The contextual information can then be determined using the contrast profile.

For example, the center of the front side can be coincident with the center of the front lens. Such a radial contrast profile can represent in particular a unique "fingerprint" fir the corresponding interchangeable objective. From this it may be possible to reliably determine the type of the interchangeable objective.

The radial contrast profile could be defined one-dimensionally. That could be done by averaging over different radial directions—or different polar angles—proceeding from the center. A particularly high signal-to-noise ratio and robustness vis-à-vis scratches, reflections, etc. can be obtained in this way.

A further technique for determining the contextual information is based on the use of CAD models (computer-aided design, CAD). For example, it would be possible for the contextual information to be determined using a plurality of CAD models as a reference for the external view of the at least one component. The CAD models can represent in particular the edges of the external view of the interchangeable component, that is to say correspond e.g. to a contour plot or to a technical line drawing. In this case, the various CAD models can be associated with different candidate interchangeable components. This can mean that a comparison of the correspondence between the at least one image and the various CAD models can be carried out, wherein the contextual information can then be determined on the basis of the degree of correspondence in the comparison. The candidate interchangeable component having the highest degree of correspondence is then the interchangeable component used.

In association with the CAD models, it may be desirable to recognize edges of the external view of the at least one interchangeable component in the at least one image. These edge features are then able to be compared with the CAD models particularly well. Edges can be recognized for example by means of a high-pass filter or bandpass filter being applied to the at least one image for edge recognition. The contextual information can then be determined using comparisons between the edges and the betas.

Such techniques described above are based on an analysis of structural features of the at least one interchangeable component—e.g. using an ANN or CAD models—which are imaged in the external view. In other examples, however, it would also be possible to recognize a machine-readable character in the at least one image. The machine-readable character can be applied as a mark on the outer housing of the at least one interchangeable component. Examples of machine-readable characters include for example QR codes or barcodes or alphanumeric type designations, etc. It is then possible for the contextual information to be determined using information encoded by the machine-readable character.

Such a technique makes it possible, in particular, to reliably determine the contextual information, even without the need to use classification algorithms, for example. Moreover, such techniques can be used to determine the contextual information with a particularly great information depth directly from the at least one image, i.e. without additionally accessing a database. By way of example, the information encoded by the machine-readable character could encode not just a type of the at least one interchangeable component, but rather also one or more operating parameters, such as, for example, an aperture and magnification (in the case of an interchangeable objective), etc. Additionally accessing a database is then not necessary in this case. In other examples, the database can be accessed even when a machine-readable character is used.

In a further example, a device includes at least one processor. The at least one processor is configured to obtain at least one image. The at least one image is an external view of at least one interchangeable component of an optical system. The at least one processor is furthermore configured to determine contextual information for the at least one interchangeable component on the basis of the at least one image.

For such a device, it is possible to achieve effects comparable with the effects which can be achieved for a method as described above.

A computer program product has program code that can be executed by at least one processor. Executing the program code causes the at least one processor to carry out a method. The method includes obtaining at least one image. The at least one image images an external view of at least one interchangeable component of an optical system. The method furthermore includes determining contextual information for the at least one interchangeable component on the basis of the at least one image.

A computer program has program code that can be executed by at least one processor. Executing the program code causes the at least one processor to carry out a method. The method includes obtaining at least one image. The at least one image images an external view of at least one interchangeable component of an optical system. The method furthermore includes determining contextual information for the at least one interchangeable component on the basis of the at least one image.

The features set out above and features that are described below may be used not only in the corresponding combinations explicitly set out, but also in further combinations or in isolation, without departing from the scope of protection of the present invention.

BRIEF DESCRIPTION OF THE DRAWINGS

The properties, features and advantages of this invention described above and the way in which they are achieved will become clearer and more clearly comprehensible in association with the following description of the exemplary embodiments which are explained in greater detail in association with the drawings, in which.

DETAILED DESCRIPTION OF EMBODIMENTS OF THE INVENTION

Figure 1:
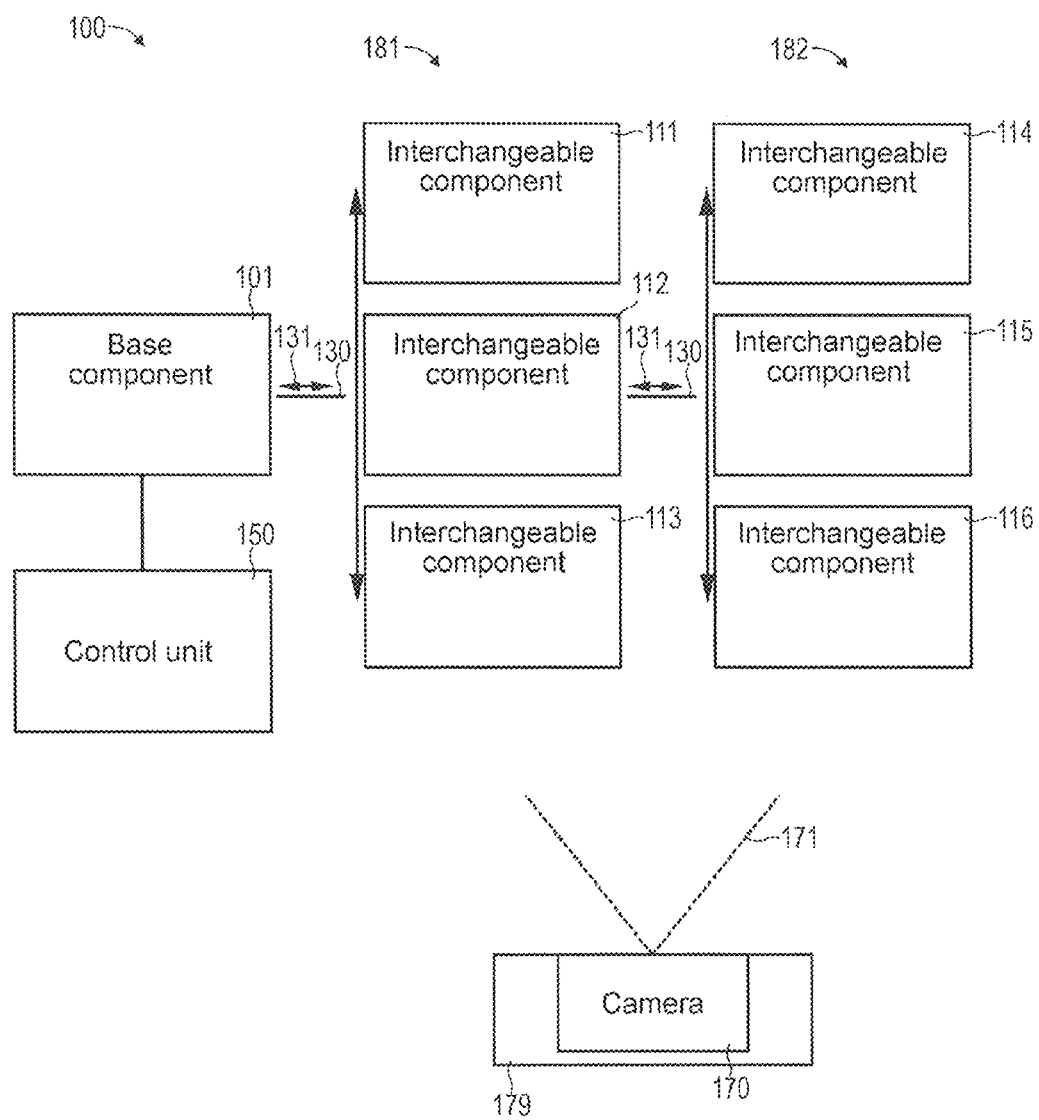
FIG. 1 schematically illustrates an optical system in accordance with various examples, having a base component and a plurality of interchangeable components.

The properties, features and advantages of this invention described above and the way in which they are achieved will become clearer and more clearly comprehensible in association with the following description of the exemplary embodiments which are explained in greater detail in association with the drawings.

The present invention is explained in greater detail below on the basis of preferred embodiments with reference to the drawings. In the figures, identical reference signs designate identical or similar elements. The figures are schematic representations of different embodiments of the invention. Elements illustrated in the figures are not necessarily depicted as true to scale. Rather, the various elements illustrated in the figures are rendered in such a way that their function and general purpose become comprehensible to the person skilled in the art. Connections and couplings between functional units and elements as illustrated in the figures may also be implemented as an indirect connection or coupling. A connection or coupling may be implemented in a wired or wireless manner. Functional units may be implemented as hardware, software or a combination of hardware and software.

Hereinafter, techniques are determined for determining contextual information for interchangeable components of an optical system. The contextual information can for example be indicative of the respective interchangeable component of the optical system, i.e. indicate e.g. a type, a serial number, and/or a batch number, etc. The contextual information could also be indicative of one or more operating parameters of the interchangeable component, for example—in the case of an interchangeable objective—the aperture and/or magnification. In the case of a filter insert as interchangeable component, the contextual information could for example be indicative of specific properties of the filter, for example phase contrast, filtered frequency range, etc. The contextual information could also include an operating instruction for the operation of the interchangeable component. The contextual information could also indicate anomalies, e.g. damage, scratches, etc.

In the various examples described herein, it is possible to determine the contextual information for the interchangeable components on the basis of one or more images which image an external view of the corresponding interchangeable component. To that end, specific features reproduced in the external view can be extracted from said one or more images. Such features can be characteristic of the interchangeable component used. By way of example, it may be possible to determine the contextual information still by accessing a database. The database could include an assignment between types of interchangeable components—which can be ascertained on the basis of the extracted features—and specific operating parameters of the respective interchangeable component.

Various examples thus relate to camera-based recognition of interchangeable components such as e.g. objectives, stage inserts, DIC sliders (insert for Differential Interference Contrast), etc. The optical systems for which the technique described can find application include e.g. binoculars, spotting scopes, telescopes, microscopes, LSMs, and other optical devices.

In order to determine the contextual information, it is possible, e.g. by means of image processing, directly to evaluate general features, e.g. shape, reflections, brightness distributions, etc.; to use a comparison with a CAD model of the interchangeable component; or to employ machine learning methods. It is also possible to recognize specific machine-readable characters such as e.g. marks, barcodes, QR codes, graphic characters, etc. Said machine-readable characters can be applied on the respective interchangeable components.

This obviates the need for electrification or the use of specific read-out devices. Backward compatibility can be provided. In addition, an erroneous use or damage of interchangeable components can thus be recognized as well. Manual inputs are avoided.

Interchangeable components of microscopes, stands, binoculars, etc. can be recognized by means of the camera of a portable user terminal—e.g. a smartphone. In this case, initially the smartphone recognizes the optical system—e.g. a microscope—and the interchangeable components used. The smartphone can subsequently record microscopy images e.g. by means of an eyepiece adapter. The smartphone can thus be used to determine interchangeable components; afterward, the smartphone can then be used as a camera for the optical system, that is to say that a measurement image can be captured by means of the camera of the smartphone and on the basis of light which has passed through an imaging optical unit of the optical system. The measurement image can thus utilize the imaging properties of the optical system. For example, the measurement image could image in a magnified fashion a sample object arranged on a stage insert. The imaging optical unit can include an objective, for example. The measurement image can utilize specific optical properties of the optical system, for example a magnification, a sample illumination, etc. In relation to the measurement image, the scale, etc. can then be determined correctly on the basis of the contextual information. As a result, within the scope of the corresponding contextual information, it is possible to adopt operating parameters such as optical specifications—e.g. magnification, field of view, etc.—such that the measurement images can subsequently be used e.g. for measurement purposes.

As an alternative or in addition to using the contextual information in the smartphone, the data could also be transmitted, e.g. in a wireless manner, to a controller of the optical system. In such a case, the smartphone could thus be used to determine the interchangeable components. The smartphone can then transmit data to the controller of the optical system and/or some other evaluation unit, e.g. a camera or a computer.

In such examples mentioned above, it would also be possible for a static camera to be used to capture the image which images the interchangeable component; the smartphone with camera can then capture a measurement image. The static camera can thus be arranged in a stationary manner in relation to the optical system.

It is evident from the above that various applications can be implemented. Specifically, in the various examples described herein, it would be possible, for example, for the at least one image that images the interchangeable component to be captured by means of a static camera, which is thus arranged in a stationary manner in relation to the optical system. In the various examples described herein, however, it would also be possible for the at least one image that images the interchangeable component to be captured by means of a mobile camera, for example a camera of a smartphone. The mobile camera is thus arranged in a movable manner in relation to the optical system. The mobile camera can have a variable pose in relation to the interchangeable component. Varying ambient conditions can be present. In some examples, it may then be possible to capture a measurement image by means of the same mobile camera and by means of the optical system. For this purpose, by way of example, the mobile camera could be attached to an eyepiece of the optical system. In the various examples described herein, it may be possible for the raw data of the at least one image that images the interchangeable component, or else data derived from the at least one image, for example the contextual information, to be transmitted by the mobile camera in a wireless manner to a further unit, e.g. a network computer. However, it would also be possible for the contextual information to be used directly by the device having the mobile camera; such an implementation may for example be desirable in particular if the mobile camera is assigned to a smartphone and a measurement image is subsequently captured by means of the smartphone.

In the techniques described herein, it is not necessary, therefore, to provide specific hardware, such as, for example, an NFC chip or an ACR ring, at the interchangeable components and, if appropriate, to carry out electrification. Moreover, it is unnecessary to retrofit existing interchangeable components for providing a corresponding automated determination of the contextual information by providing corresponding active hardware. The interchangeable components possibly need not be altered. This can enable the techniques described herein to be implemented particularly advantageously. The complexity of the techniques described herein can also be comparatively low. By way of example, it may be unnecessary to provide a large number of small parts. In comparison with manual solutions, the techniques described herein can be carried out in an automated manner. This simplifies the user interaction and furthermore avoids instances of erroneous operation. Furthermore, the techniques described herein can also be used in such fields of application in which, for example, it is not possible to determine contextual information by means of electrical data transmission. This may be the case for example with purely mechanical systems such as a manual routine microscope, binoculars or telescopes.

FIG. 1 illustrates aspects with respect to one exemplary optical system 100. The example in FIG. 1 illustrates a modular optical system comprising a base component 101, e.g. a stand. The base component 101 is configured to fix two interchangeable components 111-116 in a releasable manner. At a first position 181, one of the interchangeable components 111-113 can be fixed in a releasable manner (in FIG. 1, the interchangeable component 112 is arranged in the beam path 130). At a second position 182, one of the interchangeable components 114-116 can be fixed in a releasable manner (in the example in FIG. 1, the interchangeable component 115 is fixed in the beam path 130 in a releasable manner). In FIG. 1, the exchange of the interchangeable components 111-116 is illustrated by the vertical arrows.

The beam path 130 is defined with respect to the base component 101 and the interchangeable components 111-116 at the positions 181, 182. For example, it would be possible for a multi-pixel detector for light 131 that is guided along the beam path 130 to be attached in the base component 101. A smartphone camera could also be secured via an eyepiece adapter. The interchangeable components 111-113 for fixing at the position 181 could implement different objectives that change the beam path 130 ("objective turret"). The interchangeable components 114-116 for fixing at the position 182 could implement sample holders that are embodied to fix a sample object in the beam path 130. In that case, it would be possible for the light 131 to be transmitted along the beam path 130 from the sample object to the detector in the base component 101.

Such a configuration is purely exemplary, and other implementations of the optical system 100 would also be possible. For example, further interchangeable components could be provided, e.g. filter inserts, etc.

In the example in FIG. 1, a camera 170 is provided, too, which is configured to capture images of the optical system 100. In particular, the camera 170 is configured to capture images which include or image an external view of the interchangeable components 111-113, 114-116. FIG. 1 illustrates a pose 171 of the camera 170 in relation to the interchangeable component 111-113, 114-116. Said pose could be defined in a fixed manner in various examples, for example if the camera 170 is secured to the base component 101. In other examples—as illustrated in FIG. 1—it would also be possible, however, for the camera 170 to be movable in relation to the optical system 100, that is to say that different poses 171 in relation to the interchangeable component 111-113, 114-116 are implemented depending on positioning. This would be the case if the camera 170 is part of a portable device 179, e.g. of a smartphone. In general, different ambient conditions can also be present in such a case.

The optical system 100 also has a control unit 150, e.g. a processor or microcontroller. The control unit 150 is configured to control the operation of the optical system 100.

Figure 2:
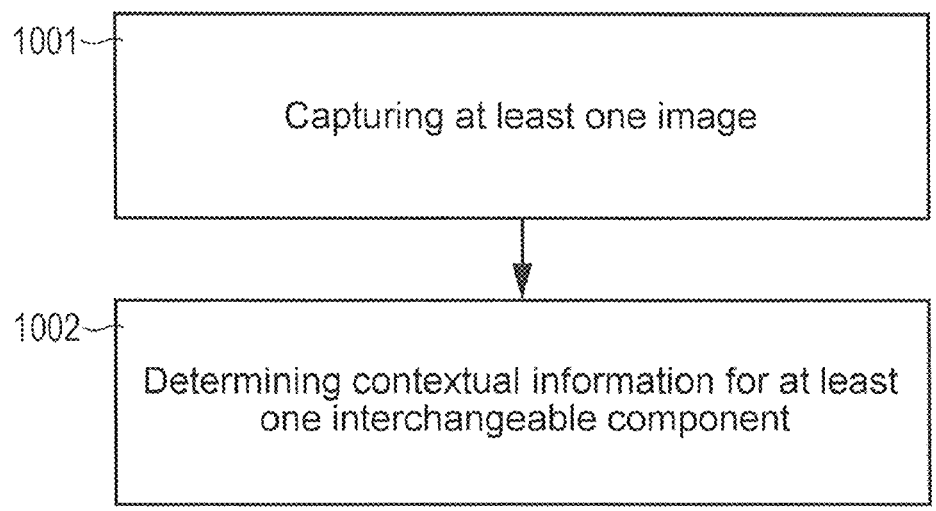
FIG. 2 is a flowchart of one exemplary method.

FIG. 2 is a flowchart of one exemplary method. 1001 involves capturing one or more images. The one or more images image an external view of at least one interchangeable component of an optical system. This means that the one or more images can image at least one part of the outer surface of one or more interchangeable components of an optical system.

1002 then involves determining contextual information for the one or more interchangeable components. This could be carried out for example by a control unit of the optical system, or else on a computing unit of a portable device, for example of a smartphone. This could also be carried out by a network computer or cloud-based computer.

The contextual information is determined on the basis of the one image or the plurality of images captured in 1001. The contextual information can for example be indicative of a type of the one or more interchangeable components. By way of example, the contextual information could indicate one or more operating parameters of the one or more interchangeable components.

If the contextual information is determined by a processor of a portable device, for example, it could be possible for the method furthermore to include: communicating the contextual information to the control unit of the optical system.

In 1002, various techniques can be used to determine the contextual information on the basis of the at least one image. One exemplary technique for determining the contextual information is illustrated with respect to FIG. 3.

Figure 3:
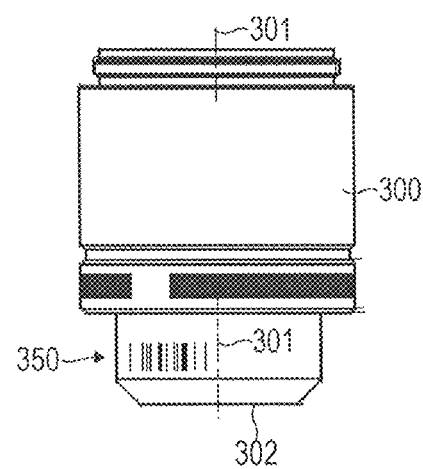
FIG. 3 illustrates an external view of the longitudinal side of an interchangeable objective in accordance with various examples.

FIG. 3 illustrates aspects in relation to an external view of an interchangeable objective 300. FIG. 3 shows the side view of one exemplary interchangeable objective 300. FIG. 3 illustrates in particular aspects in relation to a machine-readable character 350. The machine-readable character 350, implemented by a barcode in the example in FIG. 3, is attached on a lateral outer surface of the interchangeable objective 300. It is possible to recognize the barcode in an image which includes the external view of the interchangeable objective 300, and then to determine the contextual information using information encoded by the barcode. In the example in FIG. 3, the barcode 350 is arranged near a front side 302 of the interchangeable objective 300 and in a manner offset relative to a central axis 301 of the interchangeable objective 300.

In particular, it would be possible, in the case of such techniques that include the use of a machine-readable character 350, for information that is characteristic of the individual interchangeable component to be encoded by the machine-readable character. This means that different interchangeable components—for example also of the same type—can use machine-readable characters which can encode different items of information, e.g. different serial numbers. Further examples of individual contextual information include: date of last maintenance; adapted individual optical parameters; aberrations; etc.

It is also possible to use machine-readable characters other than barcodes, for example QR codes or ShotCodes. A machine-readable character can also be applied subsequently on interchangeable components. Complex hardware adaptations are obviated, for example in comparison with reference systems based on attaching NFC chips.

Figure 4:
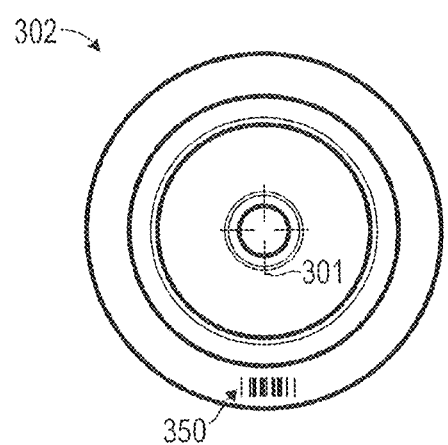
FIG. 4 illustrates an external view of the front side of an interchangeable objective in accordance with various examples.

While, in the example in FIG. 3, the machine-readable character 350 is attached laterally to the interchangeable objective 300, other techniques for attaching the machine-readable character are also conceivable. By way of example, the machine-readable character 350 could be attached on the front side 302 of the interchangeable objective 300. This is illustrated in FIG. 4.

Instead of barcodes, by way of example, text recognition could also be carried out. From the factory, some interchangeable objectives are inscribed laterally with model designation, serial number, optical properties, etc. Such text can be used to determine the contextual information on the basis of a corresponding image. In addition to the type of the interchangeable objective, further indicated information can then be read out as well, for example information applied by additional inscription.

It may sometimes be desirable to carry out a different technique for determining contextual information instead of such a determination of contextual information on the basis of machine-readable characters. One example of a further technique for determining contextual information is based on extracting features of the external view of the interchangeable component which are imaged by one or more images. By way of example, it is evident from FIGS. 3 and 4 that the external view of the interchangeable objective 300 has characteristic features, such as geometry and contrast profile, for example. Such features can be recognized for example by means of a computer-implemented algorithm—for example a machine learning algorithm (e.g. for classification, regression, localization, segmentation, detection, etc.)—and the contextual information can be determined on the basis thereof. By way of example, an ANN could be used as a classification algorithm. In this case, the classification algorithm can be trained on the basis of the reference image data which image the corresponding interchangeable component for example under different typical poses and ambient conditions. Examples of ambient conditions include e.g. illumination, shading of parts of the imaged interchangeable component by other components, dirt, image noise, etc. As a result, the determination of the classification information can also be made possible on the basis of images with variable poses and/or ambient conditions.

In the case of such recognition of interchangeable components which is based on the appearance of the interchangeable components, it may be unnecessary to alter the interchangeable components, for example by attaching a machine-readable character. The type of the interchangeable component can be determined for example solely on the basis of the image captured by the camera. This makes possible particularly simple operation that is less susceptible to errors. In this case, the front side 302 of interchangeable objectives 300 is particularly characteristic and thus suitable for recognizing the type of the interchangeable component.

Figure 5:
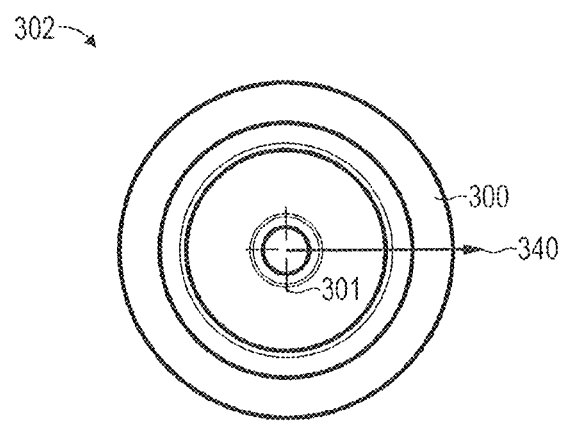
FIG. 5 illustrates an external view of the front side of an interchangeable objective in accordance with various examples.
Figure 6:
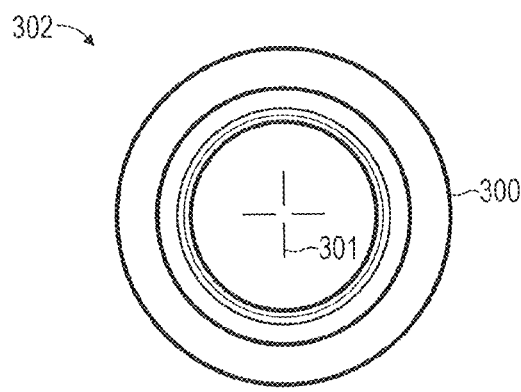
FIG. 6 illustrates an external view of the front side of an interchangeable objective in accordance with various examples.

FIGS. 5 and 6 schematically illustrate the front sides 302 of different interchangeable objectives 300. By way of example, the interchangeable objective 300 in accordance with the example in FIG. 5 could have a comparatively small opening of the aperture, such that the front lens also has small dimensioning; while the interchangeable objective 300 in accordance with the example in FIG. 6 has a comparatively large opening of the aperture and thus a larger front lens. If the image images the front side 302 of the interchangeable objective 300, this can be utilized for determining the contextual information particularly reliably. This may be possible because a differentiation between different interchangeable objectives 300 can be implemented particularly reliably.

In order to obtain an image with the front side 302 or generally the external view of an interchangeable component, for example the camera 170 is attached to the optical system 100 at a known, fixed place, for which reason it is possible to predefine the pose of the objective 300 in the corresponding camera image. Alternatively, it is also possible to use a calibration, an automatic detection or a manual method for localizing the objective in the image. As illumination, the ambient light can be used, but it is also possible to employ active illumination (e.g. a controllable LED array).

Methods from the areas of image processing and machine learning can then be used to distinguish different interchangeable components 111-116, 300 on the basis of the image information. In this case, the corresponding workflow is manifested e.g. as follows:

(I) Training (Classification Model is Created)

recording a training sample: Images of interchangeable components 111-116 which are intended to be distinguished later are recorded. In this case, the ambient conditions should be varied in like manner to how they may also occur later during the recognition. That is to say that if ambient light is used, the LED illumination should be varied.

ROI localization: For each image, the position—e.g. determined by the center of the front side 302 and the radius of the objective 300—of the interchangeable component imaged therein is determined (region of interest, ROI), either using prior knowledge for camera positioning by means of an automatic detection algorithm or by means of a manual method. This step is optional; for an ANN, in particular, it is also possible to use the complete image for the next step.

Feature extraction: Features which allow the various objective models to be differentiated are automatically extracted from the ROI, e.g. that image excerpt which shows the interchangeable objective 300 in plan view. A corresponding "feature vector" is generated for each image.

Learning the classification algorithm: A classification algorithm, i.e. a mathematical model that maps a respective feature vector onto an objective model, is learned on the basis of the training sample. In addition, a rejection class for unknown objective models or for input images having unsuitable image information, e.g. overexposed images, can also be concomitantly recorded.

(II) Test (An Objective is Intended to be Recognized by the Classification Model Created)

Recording the camera image: An image of the interchangeable component to be recognized is recorded.

ROI localization: carried out as in I.

Feature extraction: carried out as in I.

Applying the classification algorithm: The trained classification algorithm is applied in order to map the previously extracted feature vector onto an objective model. Depending on the classification algorithm, a probability distribution over all objective models seen in training can also be output.

Two specific implementations for the workflow mentioned above are outlined below. These are examples—it is entirely possible for the points mentioned above also to be resolved using other methods from the area of machine learning. The example is presented purely illustratively for an image of the front side 302 of an interchangeable objective, but could also be applied to other interchangeable components or other views.

In one possible implementation, the feature extraction is carried out as follows:

The image of the ROI of the front side 302 is converted into an image in polar coordinates, centered at the center 301.

A radial contrast profile is then determined. This is illustrated in FIG. 7.

Figure 7:
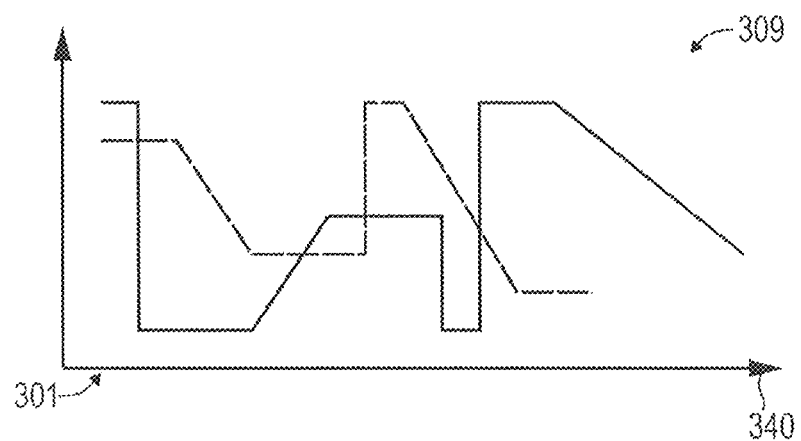
FIG. 7 illustrates a radial contrast profile proceeding from a center of the front side of an interchangeable objective in accordance with various examples.

FIG. 7 illustrates aspects in relation to a radial contrast profile 309 (the radial direction 340 is also depicted in FIG. 5). FIG. 7 illustrates exemplary contrast profiles 309 for two different interchangeable objectives 300 (solid and dashed lines). It is evident from FIG. 7 that the radial contrast profiles 309 differ characteristically, that is to say have characteristic features such as e.g. maxima, minima, plateaus, etc.

The averaged radial contrast profile 309 is created by determining e.g. a median projection against the angle axis of the polar coordinate image. This results in a one-dimensional "fingerprint" having the median contrast over all angles for any distance with respect to the front side 302. This exploits the fact that the appearance of the front side 302 is radially symmetrical. The median determines the median contrast, which is robust vis-à-vis scratches, reflections, etc.

From the 1D fingerprint, a vector of texture features is extracted, consisting of: (i) the intensity values of all pixels of the fingerprint and (ii) the Haralick features of the fingerprint. See Robert M. Haralick, K. Sam Shanmugam, Its'hak Dinstein: Textural Features for Image Classification. IEEE Transactions on Systems, Man, and Cybernetics (TSMC) 3(6):610-621 (1973).

The feature extraction is followed by the classification of the features, for example by means of an SVM. See Christopher M. Bishop. "Pattern Recognition and Machine Learning", Springer, 2006.

In a further possible implementation, the feature extraction is effected by the use of an ANN. In this case, the ANN can be used in various ways. By way of example, the ANN can be used for the classification, regression, segmentation, detection, and/or localization. The ANN can carry out grouping into different classes. In this case, the different classes can indicate for example comparatively abstractly different features, wherein then on the basis of a corresponding feature vector a downstream classification algorithm, for example an SVM, can be used to determine the contextual information—for example the type of the interchangeable objective. Alternatively, however, it would also be possible for the ANN to carry out grouping into comparatively specific classes, for example already in relation to the type of the interchangeable objective.

A description has been given above of various techniques for determining contextual information for the corresponding interchangeable objective on the basis of recognizing the type of interchangeable objectives 300. In general, however, the techniques described herein can also be used for other interchangeable components, for example for stands, holding frames or stage inserts, filter inserts such as, for example, DIC sliders, analyzers, or stage inserts.

With respect to a stage insert, the feature extraction can also be effected using an ANN. In this case, the ANN can be used in various ways. By way of example, the ANN can be used for the classification, regression, segmentation, detection, and/or localization. The ANN can carry out grouping into different classes. In this case, the different classes can indicate for example comparatively abstractly different features, wherein then on the basis of a corresponding feature vector a downstream classification algorithm, for example an SVM, can be used to determine the contextual information—for example the type of the stage insert. Alternatively, however, it would also be possible for the ANN to carry out grouping into comparatively specific classes, for example already in relation to the type of the stage insert.

Figure 8:
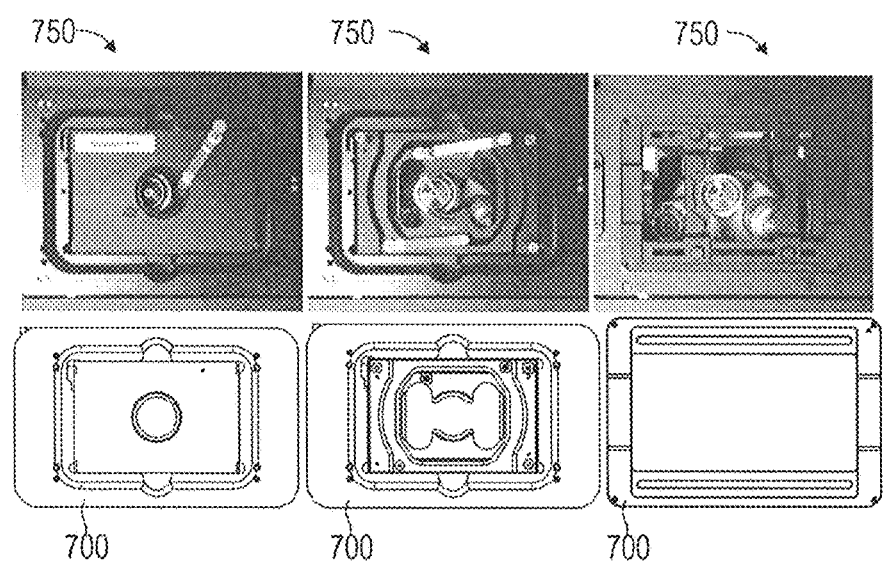
FIG. 8 schematically illustrates external views of stage inserts in accordance with various examples, and associated CAD models.

FIG. 8 illustrates aspects in relation to a stage insert. FIG. 8 depicts examples of three holding frame models 750 and the 2D plan view wire-frame model 700 thereof as a CAD model. A description is given below of one exemplary technique which makes it possible to determine the contextual information by means of a comparison of the image data with CAD models.

A further technique for recognizing the type of the interchangeable component 111-116—and thus the contextual information—is thus a comparison with existing electronic models, in particular CAD models. To that end, e.g. the camera is used firstly to record one or more images of the external view of the interchangeable component 111-116, 300 from above and/or from the side. Afterward, the existing electronic CAD models 700 as reference can be compared with the recorded images in order to identify the objective model that can be seen in the images.

There are a large number of existing approaches for the specific comparison between CAD model 700 and image: In Ulrich Wiedemann, Steger: "CAD-based recognition of 3D objects in monocular images" (ICRA 2009), for example, the 3D pose of objects is estimated from an image using known CAD models 700.

However, a comparison between the (i) edge image calculated from the camera image and (ii) the 2D wire-frame projections calculated from the CAD models 700 is sufficient in many cases. The comparison is carried out here e.g. by means of chamfer matching from Barrow, Tenenbaum, Bolles, Wolf: "Parametric correspondence and chamfer matching: Two new techniques for image matching" (IJCAI 1977), and the CAD model 700 having the smallest matching error then corresponds to the interchangeable component 111-116, 300 imaged in the image. The pose of the camera can be known; therefore, the position of the interchangeable components to be recognized in the image is usually known as well. This can influence the comparison as an additional limitation, which significantly reduces the search space and thereby increases the robustness of the method.

In the comparison between images and CAD models 700, however, care should be taken to ensure that in general only the structure information, e.g. in the form of a wire-frame model, is used for the recognition, since surface properties, such as e.g. the reflection behaviour, are typically dependent on the processing and are not necessarily stored in the CAD models.

To summarize, a description has been given above of techniques for determining contextual information for one or more interchangeable components of an optical system. In this case, the interchangeable components can be recognized from images which represent an external view of the interchangeable component. The contextual information can then be determined on the basis of a recognized type of the interchangeable component. Such an image-based recognition of the interchangeable components or the determination of the contextual information makes it possible to make particularly few or no alterations to the interchangeable components. In particular it may be unnecessary to integrate electronic components such as NFC chips, for example, into the interchangeable components. Furthermore, it is possible to determine contextual information having particularly great information contents. By way of example, it is possible for the contextual information to be indicative of an erroneous use, such as, for example, an incorrect positioning of the corresponding interchangeable component, or damage to components, such as scratches, for example. By way of example, such anomalies could also be determined from an image which includes an external view of the interchangeable components.

The techniques described herein make it possible to be flexible in relation to the techniques used for capturing images which include the external view of one or more interchangeable components. By way of example, one or more fixedly installed overview cameras could be used to recognize different interchangeable components. Active illumination, for example by means of light emitting diodes, could also be provided for this purpose. As a result, reproducible illumination conditions can be achieved, which can be advantageous with regard to accuracy and robustness. Instead of a fixedly installed camera, it is also possible to use a mobile camera. In this case, the pose of the camera can be variable. Suitable machine learning techniques can then make it possible to compensate for variable poses. By way of example, the variable pose can be determined for this purpose. Accordingly, it would alternatively or additionally also be possible to determine and to compensate for variable ambient conditions, for example shading in the image that images the interchangeable component, image artefacts, different ambient conditions, etc.

It goes without saying that the features of the embodiments and aspects of the invention described above can be combined with one another. In particular, the features can be used not only in the combinations described but also in other combinations or on their own without departing from the scope of the invention.

By way of example, a description has been given above of techniques in which contextual information is determined on the basis of at least one image. In this case, the corresponding logic could be arranged for example in a control unit of an optical system. Alternatively or additionally, it would also be possible for the corresponding logic to be arranged for example in a separate device such as, by way of example, a smartphone or a computer—connected via a communication network, for example. If determining the contextual information necessitates a database access, cloud computing techniques can also be used.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method, comprising:
   obtaining at least one image which depicts an external view of at least one interchangeable component of an optical system, and
   determining contextual information for the at least one interchangeable component on the basis of the at least one image,
   wherein the contextual information is determined using an image processing algorithm and/or a machine learning algorithm, using an artificial neural network or a support vector machine,
   wherein the at least one interchangeable component comprises an interchangeable objective,
   wherein the at least one image depicts a front lens of the interchangeable objective,
   determining a center of the front lens in the at least one image, and
   determining a contrast profile of the at least one image in a radial direction proceeding from the center of the front lens, the contrast profile indicating a change in contrast of the at least one image in the radial direction,
   wherein the contextual information is determined using the contrast profile.

2. The method as claimed in claim 1,
   wherein the machine learning algorithm is trained on the basis of reference image data which image the at least one interchangeable component under different poses and/or ambient conditions.

3. The method as claimed in claim 1, furthermore comprising:
   recognizing a machine-readable character in the at least one image,
   wherein the contextual information is determined using information encoded by the machine-readable character.

4. The method as claimed in claim 1,
   wherein the at least one image depicts the at least one interchangeable component with a predefined pose.

5. The method as claimed in claim 1, furthermore comprising:
   capturing the at least one image by means of a camera of a portable device, and
   determining a pose and/or ambient condition with which the at least one image depicts the at least one interchangeable component,
   wherein the contextual information is determined on the basis of the determined pose and/or the determined ambient condition.

6. The method as claimed in 1,
   wherein the at least one interchangeable component is selected from the following group: stage insert; illumination module; analyzer stand; Wollaston (Nomarski) prism, stand; and filter insert.

7. The method as claimed in claim 1,
   wherein determining the contextual information comprises:
      determining a type of the at least one interchangeable component on the basis of the at least one image, and
      accessing a database and determining an operating parameter of the at least one interchangeable component on the basis of the type of the at least one interchangeable component.

8. The method as claimed in claim 1,
   wherein determining the contextual information comprises:
      recognizing anomalies in the at least one image.

9. The method as claimed in claim 1, furthermore comprising:
   capturing the at least one image by means of a camera arranged in a stationary manner in relation to the optical system.

10. The method as claimed in claim 1, furthermore comprising:
    capturing the at least one image by means of a camera arranged in a movable manner in relation to the optical system.

11. The method as claimed in claim 10, furthermore comprising:
    capturing a measurement image by means of the camera on the basis of light which has passed through an imaging optical unit of the optical system.

12. A method, comprising:
obtaining at least one image which depicts an external view of at least one interchangeable component of an optical system, and
determining contextual information for the at least one interchangeable component on the basis of the at least one image,
wherein the contextual information is determined using an image processing algorithm and/or a machine learning algorithm, using an artificial neural network or a support vector machine,
wherein the contextual information is indicative of geometric dimensions of the at least one interchangeable component, wherein the method furthermore comprises:
on the basis of the contextual information: recognizing possible collisions between the at least one interchangeable component and a further component of the optical system.

13. A device comprising at least one processor, configured to carry out the following steps:
obtaining at least one image which depicts an external view of at least one interchangeable component of an optical system,
determining contextual information for the at least one interchangeable component on the basis of the at least one image,
wherein the contextual information is determined using an image processing algorithm and/or a machine learning algorithm, using an artificial neural network or a support vector machine,
wherein the at least one interchangeable component comprises an interchangeable objective,
wherein the at least one image depicts a front lens of the interchangeable objective—determining a center of the front lens in the at least one image, and
determining a contrast profile of the at least one image in a radial direction proceeding from the center of the front lens, the contrast profile indicating a change in contrast of the at least one image in the radial direction,
wherein the contextual information is determined using the contrast profile.

14. A device comprising at least one processor, configured to carry out the following steps:
obtaining at least one image which depicts an external view of at least one interchangeable component of an optical system, and
determining contextual information for the at least one interchangeable component on the basis of the at least one image,
wherein the contextual information is determined using an image processing algorithm and/or a machine learning algorithm, using an artificial neural network or a support vector machine,
wherein the contextual information is indicative of geometric dimensions of the at least one interchangeable component,
wherein the method furthermore comprises:
on the basis of the contextual information: recognizing possible collisions between the at least one interchangeable component and a further component of the optical system.

* * * * *

UNITED STATES PATENT AND TRADEMARK OFFICE
CERTIFICATE OF CORRECTION

| | | |
|---|---|---|
| PATENT NO. | : 12,007,546 B2 | Page 1 of 1 |
| APPLICATION NO. | : 16/610246 | |
| DATED | : June 11, 2024 | |
| INVENTOR(S) | : Daniel Haase and Thomas Ohrt | |

It is certified that error appears in the above-identified patent and that said Letters Patent is hereby corrected as shown below:

On the Title Page

The Inventors:
Now reads: "(72) Inventors: Daniel Haase, Zollnitz (DE); Thomas Ohrt, Golmsdors (DE)"
Should read: -- (72) Inventors: Daniel Haase, Jena (DE); Thomas Ohrt, Jena (DE) --

The PCT Publication:
Now reads: "(87) PCT Pub. No.: WO2018/202454"
Should read: -- (87) PCT Pub. No.: WO2018/202454 A2 --

In the Specification

Column 6, Line 47:
Now reads: "a unique "fingerprint" fir the"
Should read: -- a unique "fingerprint" for the --

Signed and Sealed this
First Day of October, 2024

Katherine Kelly Vidal
*Director of the United States Patent and Trademark Office*